(12) United States Patent
de Barros Chapiewski et al.

(10) Patent No.: US 12,093,931 B2
(45) Date of Patent: Sep. 17, 2024

(54) VIRTUAL CURRENCY EXCHANGE PLATFORM

(71) Applicant: PayPal, Inc., San Jose, CA (US)

(72) Inventors: Guilherme de Barros Chapiewski, San Jose, CA (US); Joanie Magdalena Munro, Burbank, CA (US)

(73) Assignee: PayPal, Inc., San Jose, CA (US)

( * ) Notice: Subject to any disclaimer, the term of this patent is extended or adjusted under 35 U.S.C. 154(b) by 239 days.

(21) Appl. No.: 17/491,233

(22) Filed: Sep. 30, 2021

(65) Prior Publication Data

US 2023/0100764 A1 Mar. 30, 2023

(51) Int. Cl.
*G06Q 20/38* (2012.01)
*G06Q 20/34* (2012.01)

(52) U.S. Cl.
CPC ......... *G06Q 20/381* (2013.01); *G06Q 20/351* (2013.01)

(58) Field of Classification Search
CPC .. G06Q 20/381; G06Q 20/351; G06Q 20/027; G06Q 20/4014; G06Q 20/06
See application file for complete search history.

(56) References Cited

U.S. PATENT DOCUMENTS

| | | | | |
|---|---|---|---|---|
| 8,327,428 B2* | 12/2012 | Bailey | ............... | G06F 21/31 |
| | | | | 713/168 |
| 8,523,657 B2* | 9/2013 | Michaelson | ........ | G07F 17/3225 |
| | | | | 463/16 |
| 10,607,442 B2* | 3/2020 | Toohey | ............... | G07F 17/3244 |
| 11,810,169 B2* | 11/2023 | Jensen | ............... | G06Q 30/0641 |
| 2008/0301047 A1* | 12/2008 | Fish | ............... | G06Q 20/105 |
| | | | | 705/41 |
| 2015/0170112 A1* | 6/2015 | DeCastro | ............. | G06Q 20/367 |
| | | | | 705/39 |
| 2017/0092060 A1* | 3/2017 | Toohey | ................. | G06F 16/254 |
| 2017/0118301 A1* | 4/2017 | Kouru | .................... | H04L 67/06 |
| 2018/0025442 A1* | 1/2018 | Isaacson | ................. | H04L 51/48 |
| | | | | 705/26.62 |
| 2019/0122222 A1* | 4/2019 | Uechi | .................... | G06Q 20/42 |

(Continued)

OTHER PUBLICATIONS

Exchangerates API (archived back to at least Jun. 23, 2021). Exchangeratesapi.io is a product built and maintained by apilayer. Referred to as "ExchangeRates". This NPL document was retrieved by the Examiner on Nov. 28, 2023 at https://web.archive.org/web/20210623122924/https://exchangeratesapi.io/documentation/.*

*Primary Examiner* — Peter Ludwig
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed for exchanging digital gaming currency directly between an online service system platform and an online gaming system platform. Various techniques disclosed describe integration of the online service system platform with the online gaming system platform and linking user accounts between the platforms. Integrating the online service system platform with the online gaming system platform and linking user accounts between the platforms allows for direct transferring of digital gaming currency between user accounts located in the online service system platform. Additionally, digital gaming currency may be directly deposited into a user's account on the online gaming system platform from the online service system platform.

20 Claims, 8 Drawing Sheets

(56) References Cited

U.S. PATENT DOCUMENTS

| | | | | |
|---|---|---|---|---|
| 2019/0180563 A1* | 6/2019 | Yi | ........................ | G07F 17/3225 |
| 2019/0332691 A1* | 10/2019 | Beadles | ............. | G06Q 20/3829 |
| 2021/0042735 A1* | 2/2021 | Majidi | ............... | G06Q 20/4016 |
| 2021/0209684 A1* | 7/2021 | Foote | ................. | G06Q 20/0655 |
| 2022/0067675 A1* | 3/2022 | Benkreira | .......... | G06Q 20/0655 |
| 2022/0261790 A1* | 8/2022 | Choi | .................... | G06Q 20/401 |
| 2023/0067833 A1* | 3/2023 | Varghese | .................. | G06F 8/34 |
| 2024/0005290 A1* | 1/2024 | Kim | ....................... | G06Q 10/10 |

\* cited by examiner

500

Integrating, by a computer system, a first application platform with a second application platform, where the first application platform implements a first currency that is generic to the first application platform, and where the second application platform implements a digital currency specific to the second application platform.
502

Where integrating the first application platform with the second application platform includes

Registering the digital currency with the first application platform.
504

Registering an application key located on the second application platform with the first application platform, the application key being associated with the first application platform.
506

Accessing one or more endpoints associated with the second application platform where registration of the application key provides access to the one or more endpoints for the first application platform, where at least one of the endpoints is a user account lookup endpoint on the second application platform, and where at least one of the endpoints is a currency conversion endpoint between the digital currency and the first currency.
508

Registering the accessed endpoints with the first application platform.
510

```
Receiving, at a first application platform, a request to enable a first user
account associated with the first application platform to operate with the
digital currency.
602
```

↓

```
Identifying, by the first application platform, a second application platform
based on the request to enable operation with the digital currency.
604
```

↓

```
Receiving, at the first application platform, identification information for a
second user account associated with the second application platform, the
second user account being associated with a user of the first user account.
606
```

↓

```
Accessing, by the first application platform, account information for the
second user account on the second application platform.
608
```

↓

```
Integrating, by the first application platform, the first user account with the
second user account where integration between the first user account and
the second user account includes storing the account information for the
second user account on the first application platform with the second user
account linked to the first user account.
610
```

```
┌─────────────────────────────────────────────────────────────┐
│ Receiving, at a first application platform, a request to    │
│ transfer a specified amount of a digital currency from a    │
│ first account for a first user to a second account for a    │
│ second user on the first application platform where the     │
│ digital currency is specific to a second application        │
│ platform, the first application platform being integrated   │
│ with the second application platform.                       │
│                              702                            │
└─────────────────────────────────────────────────────────────┘
                              ↓
┌─────────────────────────────────────────────────────────────┐
│ Identifying, at the first application platform, an account  │
│ for the second user on the second application platform that │
│ is linked with the second account on the first application  │
│ platform.                                                   │
│                              704                            │
└─────────────────────────────────────────────────────────────┘
                              ↓
┌─────────────────────────────────────────────────────────────┐
│ Determining, at the first application platform, a specified │
│ amount of a generic currency for the transfer of the        │
│ specified amount of the digital currency based on a         │
│ currency conversion rate between the digital currency and   │
│ the generic currency.                                       │
│                              706                            │
└─────────────────────────────────────────────────────────────┘
                              ↓
┌─────────────────────────────────────────────────────────────┐
│ Transferring the specified amount of the generic currency   │
│ from the first account to the second account, wherein the   │
│ second account receives the transfer in the specified       │
│ amount of the digital currency from the transfer request.   │
│                              708                            │
└─────────────────────────────────────────────────────────────┘
```

FIG. 7

VIRTUAL CURRENCY EXCHANGE PLATFORM

BACKGROUND

Technical Field

This disclosure relates generally to methods for directly exchanging digital gaming currency between different application platforms, according to various embodiments.

Description of the Related Art

Online gaming platforms are ubiquitous today, providing various different types of gaming services. For instance, online gaming platforms may provide online gaming capabilities that are available across various operating systems implemented on different hardware (e.g., mobile devices or computers). In various implementations, online gaming platforms have their own digital currency that is managed with the online gaming platforms and only has value within the online gaming platforms. The purchase (e.g., buying using legal currency) of digital gaming currency associated with many online gaming systems, however, is controlled by the owners of the operating systems being implemented on the hardware. Applicant recognizes that there are advantages to providing direct exchange of digital gaming currency, and provides solutions discussed below.

BRIEF DESCRIPTION OF THE DRAWINGS

FIG. 5 is a flow diagram illustrating a method for integrating application platforms, according to some embodiments.

FIG. 6 is a flow diagram illustrating a method for integrating accounts on application platforms, according to some embodiments.

FIG. 7 is a flow diagram illustrating a method for transferring currency between accounts on application platforms, according to some embodiments.

Figure 1:
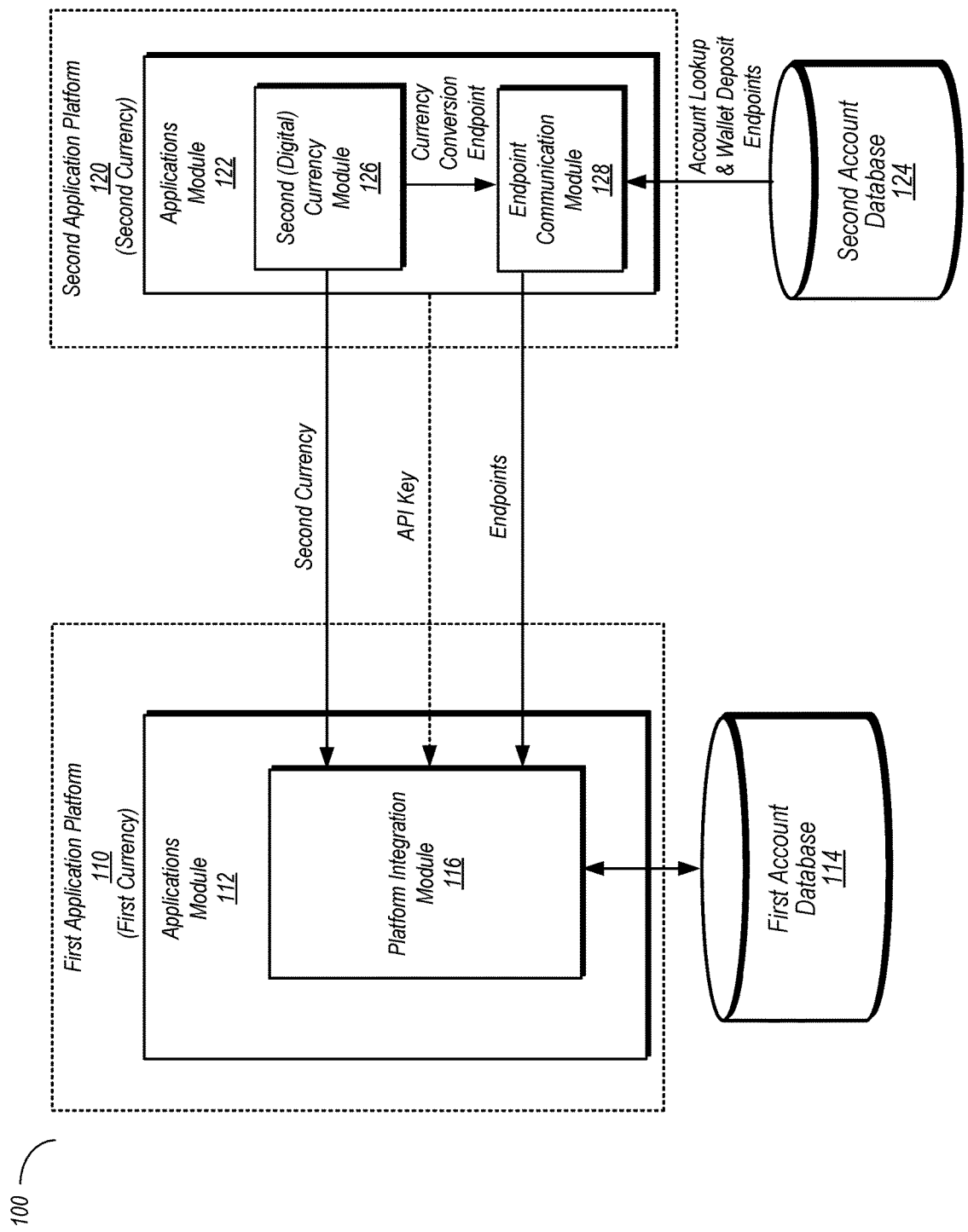
FIG. 1 is a block diagram of a system of integrated application platforms, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to the sharing and exchanging of digital currency between application platforms where one of the application platforms implements a platform-specific digital currency. Various application platforms (such as online gaming platforms) implement digital currencies that are specific to, and only intended for use with, the application platform. For instance, gaming platforms such as Roblox, Fortnite, and Pokémon Go implement digital gaming currencies (e.g., "Robux," "v-bucks," and "PokeCoins," respectively) that can only be stored and transacted through designated software, mobile, or computer applications associated with each gaming platforms itself. These digital currencies have no legal monetary value outside the gaming platform with their only link to legal monetary value being the purchase of such digital currencies using legal tender currency (e.g., dollars, euros, etc.).

In various embodiments, online gaming platforms provide online gaming capabilities that are available across multiple operating systems implemented on various types of hardware (e.g., mobile devices or computers). For instance, software associated with an online gaming platform may be installed on a hardware system where the hardware system is controlled by the installed operating system. Accordingly, the operating system installed on the hardware system provides hosting capability for the online gaming platform and controls operation of the online gaming platform on the hardware system. Examples of operating systems for various hardware systems include, but are not limited to, iOS®, Android®, and Windows®.

In many instances, transactions involving digital gaming currency are confined to the gaming platform within the realm of the operating system hosting the gaming platform software. Digital gaming currency may be used within the gaming platform to make purchases of items within a game while the host operating system controls the purchase of digital gaming currency within the gaming platform. For example, the host operating system may offer "in-app" purchasing of digital gaming currency or other operating system controlled purchasing of digital gaming currency. Controlling the purchase of digital gaming currency allows the host operating system to maintain control over the gaming platform and take a cut (e.g., percentage) of each digital gaming currency purchase transaction.

Online service systems (such as transaction service network systems) may also have application platforms that operate on various instances of hardware systems and operating systems. Application platforms for online service systems may provide the capability of transferring legal currency (e.g., dollars, euros, etc.) between different users. For example, Venmo®, PayPal®, or another online service application platforms may allow peer-to-peer transferring of a specified amount of legal tender currency from one user to another user. Such online service systems, however, do not have the current capability to provide transfer of digital gaming currency between users.

The present inventors have realized that integration of online service systems (such as Venmo® or PayPal®) with online gaming platforms (such as Roblox, Fortnite, Pokémon Go, etc.) may provide the benefits of peer-to-peer type transactions for many online gamers. For example, integration of online service systems with online gaming platforms may provide the capability to implement services (e.g., exchanges or transactions) for digital gaming currencies outside of the online gaming platform and its host operating system. The integration may, however, allow the implemented services to be directly linked with the online gaming platform. For instance, any digital gaming currency transaction for a user would be directly linked with the user's account in the online gaming platform. Thus, the user could have digital gaming currency directly deposited into the user's online gaming account from another account located outside of the online gaming platform (e.g., an account on the online service system). In various embodiments, online gamers and other online users may be able to directly exchange digital gaming currency with each other outside of the online gaming platform (e.g., from one online service system account to another online service system account) and the money can then be directly transferred to the recipient's online gaming account. Additionally, integration of online service systems with online gaming platforms may provide the capability of purchasing of digital gaming currency outside of the host operating system, thus allowing digital gaming currency to be purchased without the host operating system receiving a percentage of the transaction.

The present disclosure contemplates various techniques for integrating online service systems with online gaming platforms. Various embodiments disclosed describe an application platform associated with an online service system that may be integrated with an online gaming platform or any other platforms that may implement its own digital currency. In some embodiments, integration of an application platform for an online service system with an online gaming platform includes providing access to the online gaming platform for one or more application programming interfaces (APIs) associated with the online service system. Once accessed and installed by the online gaming platform, the API(s) may provide capability for the integration of the online platform with the application platform for the online service system. In various embodiments, the integration includes registering the digital gaming currency for the online gaming platform with the application platform for the online service system. Integration may also include registration of various endpoints in the online gaming platform with the application platform for the online service system. Registration of endpoints in the online gaming platform may allow the application platform for the online service system to access various resources in the online gaming platform associated with the endpoints during implementation of transactions.

One embodiment described herein for integration of an application platform for an online service system with an online gaming platform has three broad components: 1) registering the digital gaming currency for the online gaming platform with the application platform for the online service system, 2) registering an application key (e.g., API key) located on the online gaming platform with the application platform for the online service system, and 3) registering endpoints (e.g., resource endpoints) on the online gaming platform with the application platform for the online service system. In various embodiments, registration of the application key provides access to the endpoints on the online gaming platform for the application platform for the online service system. Examples of endpoints on the online gaming platform include, but are not limited to, endpoints associated with account lookup, currency conversion (between the digital gaming currency and any legal tender currency associated with the online service system), and wallet deposit. Registration of these endpoints may allow the application platform for the online service system to communicate with the resources associated with the endpoints during transactions involving the online gaming platform and the application platform for the online service system.

After integration between the application platform for the online service system with the online gaming platform, various embodiments disclosed describe the linking of an account for a user on the online service system with an account for the user on the online gaming platform. Linking of the accounts may allow direct placement of digital gaming currency into the user's online gaming platform account from the online service system. Various embodiments disclosed also contemplate enhancing a user's experience after integration of the user's accounts. For instance, the online service system may integrate selection of the user's online gaming platform account into operations implemented by the online service system. Additional embodiments disclosed contemplate the transfer of digital gaming currency from one user to another user where the sending user is debited in legal tender currency and the receiving user receives digital gaming currency directly in his/her online gaming platform account.

In short, it can be recognized that benefits exist in integrating an application platform for an online service system with an online gaming platform. Integration of these platforms may allow a user of the online gaming platform to purchase digital gaming currency outside the realm of the operating system hosting the online gaming platform on the user's hardware system. Additionally, integration of these platforms may allow users to conduct transactions or exchanges using the digital gaming currency within the online service system. Thus, integration of an application platform for an online service system with an online gaming platform expands the capabilities for users to implement digital currency transactions on their own or in associated with other users.

FIG. 1 is a block diagram of a system of integrated application platforms, according to some embodiments. In the illustrated embodiment, system 100 includes first application platform 110 and second application platform 120. As used herein, the term "application platform" refers to a platform that implements one or more applications associated with an online system. As used herein, the term "online system" refers to any system that is implemented or communicates over a network. In various embodiments, first application platform 110 or second application platform 120 are implemented on server systems. Server systems may be online servers or other online computer systems associated with an online system. For example, first application platform 110 may be implemented on first server system serving a first online system while second application platform 120 is implemented on a second server system serving a second online system.

In certain embodiments, first application platform 110 is implemented by an online service system. As used herein, the term "online service system" refers to any system that implements a service over a network in which two or more parties use computer systems to exchange information. Accordingly, a "service" according to this disclosure may include a transaction service, a payment service (e.g., PayPal® or Venmo®), a transportation service, a customer service operation, a media network, a social network, a file transfer service, an online retailer, a dating site, and so on. Thus, in certain embodiments, first application platform 110 is a transaction service platform. Note that generally, this disclosure may include various examples and discussion of techniques and structures within the context of an "online service system." Note that all these examples, techniques, and structures are generally applicable to any computer-based system that has a flow of information between different entities. For example, an online service system may include any number of online systems and application platforms that communicate with each other and exchange information for transactions or services between the online systems. However, the term online service system is used for ease of understanding in various portions of this disclosure.

In certain embodiments, second application platform 120 is implemented by an online gaming system. As used herein, the term "online gaming system" refers to any system that implements a gaming service over a network. Accordingly, second application platform 120 may be a gaming platform. As used herein, the term "gaming platform" refers to any platform that implements online gaming capabilities. Examples of gaming platforms include, but are not limited to, Roblox, Fortnite, and Pokémon Go. Gaming platforms, such as second application platform 120, may provide online gaming capabilities when software applications for the gaming platform are installed on hardware systems (e.g., mobile devices, laptop computer, desktop computers, gaming consoles, etc.). Accordingly, gaming platform software may be implemented in a variety of operating systems.

In the illustrated embodiment, first application platform 110 includes applications module 112 linked to first account database 114 and second application platform 120 includes applications module 122 linked to second account database 124. In certain embodiments, applications module 112 implements software applications that provide functionality for data handling (e.g., data storage and retrieval) or data processing (e.g., transaction processing or customer service processing) for first application platform 110. Similarly, applications module 122 may implement software applications that provide functionality for data handling (e.g., data storage and retrieval) or data processing (e.g., gaming process, transaction processing, or customer service processing) for second application platform 120. In various embodiments, applications module 112 and applications module 122 may interact with users via various APIs or web applications to provide functionality for data handling interactions or data processing interactions in first application platform 110 and second application platform 120, respectively. Examples of APIs or web applications for interacting with applications module 112 include, but are not limited to, merchant APIs, customer APIs, distributor APIs, checkout APIs, payment APIs, shipping APIs, gaming APIs, or similar web applications.

First account database 114 and second account database 124 may be databases for storing and maintaining data (e.g., account data) associated with users of first application platform 110 and second application platform, respectively. First account database 114 and second account database 124 may include single databases, groups of databases on distributed nodes, databases on a central server, etc. First account database 114 may store and maintain data for users that are associated with first application platform 110 (e.g., users associated with the online service system served by first application platform 110 (the "transaction service platform")) while second account database may store and maintain data for users that are associated with second application platform 120 (e.g., users associated with the online gaming system served by second application platform 120 (the "gaming platform")).

In the illustrated embodiment, first application platform 110 implements a first currency and second application platform 120 implements a second currency. In various embodiments, the first currency can be either a legal tender currency or a fiat currency. As used herein, the term "legal tender currency" refers to any currency, money, or money-like asset with legal monetary (cash) value that has the legal sanction of a government behind it whether limited or unlimited sanction. As used herein, the term "fiat currency" refers to any currency, money, or money-like asset with no intrinsic value that is backed by an order (fiat) of a government to act as money. Legal tender currency and fiat currency can be inclusive of each other. For instance, U.S. dollars are both legal tender currency and fiat currency. In various embodiments, the first currency is generic currency (e.g., non-specific currency). As used herein, the term "generic currency" refers to any currency, money, or money-like asset that is generic or non-specific to a particular application platform and has value (such as monetary value) outside the particular application platform. For instance, the first currency may be a generic currency such as U.S. dollars that has value outside first application platform 110 and the online system associated with the first application platform. Generic currency is inclusive legal tender currency and fiat currency. Thus, the first currency may be generic currency while also being legal tender currency and fiat currency.

In various embodiments, the second currency can be a non-legal tender currency or non-fiat currency. As used herein, the term "non-legal tender currency" refers to any currency, money, or money-like asset with no legal monetary (cash) value. As used herein, the term "non-fiat currency" refers to any currency, money, or money-like asset with no intrinsic value that has no government backing to act as money. In various embodiments, the second currency is specific to second application platform 120 such that the second currency only has value (such as gaming currency value) in the second application platform and the online system associated with the second application platform. For example, the second currency may be a digital or independent currency specific to second application platform 120. As used herein, the term "digital currency" refers to any currency, money, or money-like asset that is primarily managed, stored, or exchanged on online (digital) computer systems. Accordingly, digital currency that is specific to second application platform 120 includes currency that is managed, stored, or exchanged through designated software associated with the second application platform 120 and its corresponding online (gaming) system. In some embodiments, digital currency that is specific to a gaming platform may be referred to as "gaming currency" or "digital gaming currency". Examples of gaming currencies include, but are not limited to, Robux, v-bucks, PokeCoins.

In the illustrated embodiment of FIG. 1, applications module 112 includes platform integration module 116. Platform integration module 116 may provide integration between first application platform 110 and second application platform 120. Integration between first application platform 110 and second application platform 120 may include, for example, integration between accounts and currency on the application platforms. In various embodiments, integration between first application platform 110 and second application platform 120 is initiated when the second application platform receives an application key (e.g., API key) associated with the first application platform. The API key may be received by second application platform 120 in response to various events (e.g., being notified of existence of the API key, a user-initiated operation, etc.). The API key may allow second application platform 120 to access various APIs or applications associated with first application platform 110 and its online system. For instance, second application platform 120 may access APIs from a portal (e.g., developer portal) associated with the online system of first application platform 110.

After receiving the API key and accessing any necessary APIs associated with first application platform 110, second application platform 120 may register various parameters with platform integration module 116 for integration between the application platforms. The parameters may include, for example, information about currency or other operating parameters, lookup locations (endpoints) for resources in second application platform 120, information about user accounts associated with the second application platform, or other resource information. In certain embodiments, as shown in FIG. 1, the second currency (e.g., digital gaming currency) is provided by second currency module 126 to platform integration module 116 for registration with the platform integration module. In various embodiments, the registration of the second currency includes platform integration module 116 generating a lookup table or other mapping tool that links the second currency to second application platform 120.

In certain embodiments, second application platform 120 registers the API key with platform integration module 116. Registration of the API key may allow platform integration module 116 to access parameters for resources in second application platform 120. For instance, after platform integration module 116 receives the API key, the platform integration module may access endpoints from endpoint communication module 128. In various embodiments, endpoints include lookup points or other destinations for communication with various resources in second application platform 120. Examples of endpoints include, but are not limited to, account lookup endpoints, currency conversion endpoints, and wallet deposit endpoints. An "account lookup endpoint" refers to a resource to find user account information in second application platform 120 (e.g., a location for looking up user accounts in second account database 126). A "currency conversion endpoint" refers to a resource to find a conversion rate for the second currency in second application platform 120 (e.g., a location for looking up a currency conversion rate between the second currency and another currency). A "wallet deposit endpoint" refers to a resource to a wallet (such as a digital wallet for a gaming platform) for depositing the digital currency in second application platform 120 (e.g., a location of a wallet for depositing currency in second account database 126).

After accessing the endpoints from endpoint communication module 128 in second application platform 120, platform integration module 116 may register the endpoints (e.g., link the endpoints) to second application platform 120. Registration of the endpoints allows any applications associated with applications module 112 and first application platform 110 to know where to look for information in second application platform 120 during subsequent operations. Accordingly, registration of the second currency, the API key, and the endpoints "integrates" first application platform 110 with second application platform 120. Integration of first application platform 110 and second application platform 120 may allow coordinated communication between the application platforms for subsequent operations.

One example of a subsequent operation is account integration (e.g., account linking) between first application platform 110 and second application platform 120. Account integration may include, for example, linking a user's account on first application platform 110 with another account for the user on second application platform 120. Accordingly, account integration may allow a user to link the user's account on an online service system (e.g., PayPal® or Venmo®) with the user's account on an online gaming system (e.g., Roblox or Fortnite).

Figure 2:
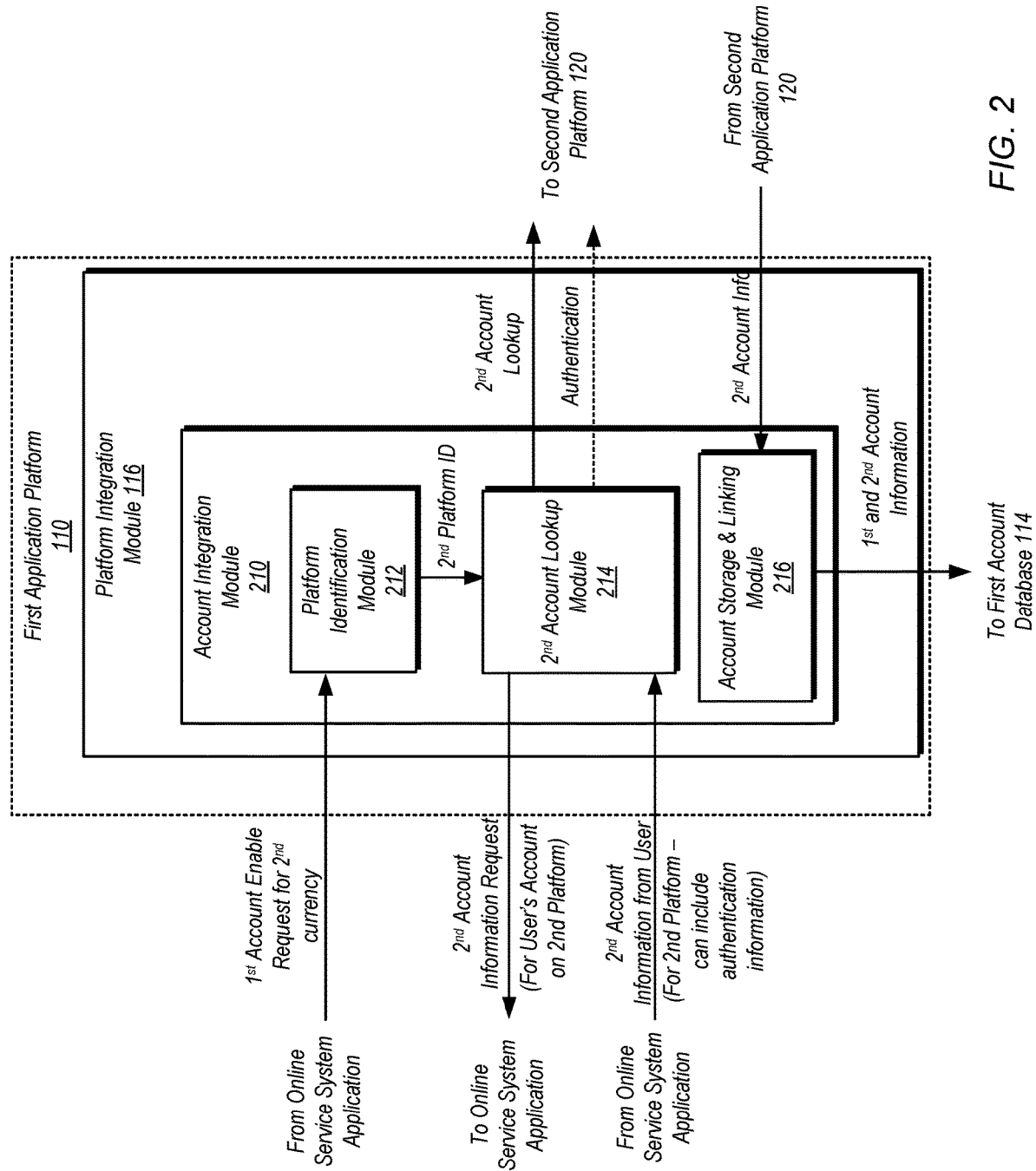
FIG. 2 is a block diagram of a first application platform, according to some embodiments.

FIG. 2 is a block diagram of first application platform 110, according to some embodiments. In the illustrated embodiment, first application platform 110 includes account integration module 210. Account integration module 210 may be implemented in platform integration module 116 (which is in applications module 112, as shown in FIG. 1). Account integration module 210 may implement account integration for a first user account on first application platform 110 with a second user account on second application platform 120. In various instances, account integration may be initiated as a request by a user of the first account on first application platform 110. For example, the user may request to enable the user's first account on first application platform 110 to receive deposits or other transfers in the second (digital gaming) currency. In some embodiments, the request is received from an online service system application being interfaced with by the user. For example, the request may be received from an application (e.g., "app") associated with the online service system in communication with first application platform 110.

In certain embodiments, the request is received by platform identification module 212 in account integration module 210. Platform identification module 212 may attempt to identify the application platform associated with the currency identified in the request (e.g., the second (digital gaming) currency). In some embodiments, platform identification module 212 accesses a lookup table or other map to identify the application platform based on the currency in the request. For example, in the illustrated embodiment, platform identification module 212 identifies second application platform 120 based on the second currency identified in the request.

In the illustrated embodiment, platform identification module 212 provides the identification of second application platform 120 to second account lookup module 214 in account integration module 210. Second account lookup module 214 may then request information for the user's second account on second application platform 120 from the user through the online service system application. For instance, a prompt for information about the user's second account may be provided on a user interface associated with the online service system application. The information requested may include, for example, the username associated with the second account and other account identification information (such as zip code or email address). Second account lookup module 214 may then access (e.g., lookup) the second account on second application platform 120 based on the username or other account information. Second account lookup module 214 may lookup the information based on the endpoints registered during integration between first application platform 110 and second application platform 120.

Information for the user's second account may then be received from second application platform 120 by account storage and linking module 216 in account integration module 210. Account storage and linking module 216 may link (e.g., register or associate) the account information for the user's second account with the user's first account on first application platform 110. In some embodiments, the account information for the user's second account is stored on first application platform 110 along with information on the link between the user's second account and the user's first account. In some embodiments, the account information and link information are stored in first account database 114, as shown in FIG. 2.

In certain embodiments, second account lookup module 214 may also request authentication information for the second account from the user before linking the user's first account on first application platform 110 with the user's second account on second application platform 120. For example, authentication information may be requested from the user after identification of the user's second account on second application platform 120. Authentication information received by second account lookup module 214 may then be communicated to second application platform 120 by second account lookup module 214 to authenticate the user as an authorized user of the second account. In some embodiments, authentication of the user is required to enable linking between the user's first account on first application platform 110 and the user's second account on second application platform 120.

With a user's account on first application platform 110 linked with a user's account on second application platform 120, the user's accounts on the two application platforms are now integrated for subsequent operations in the online service system or the online gaming system. For instance, the user's account on the online service system (e.g., the first account) may be capable of conducting transactions (e.g., payments or requests) in the second currency associated with second application platform 120 (e.g., the digital gaming currency).

Figure 3:
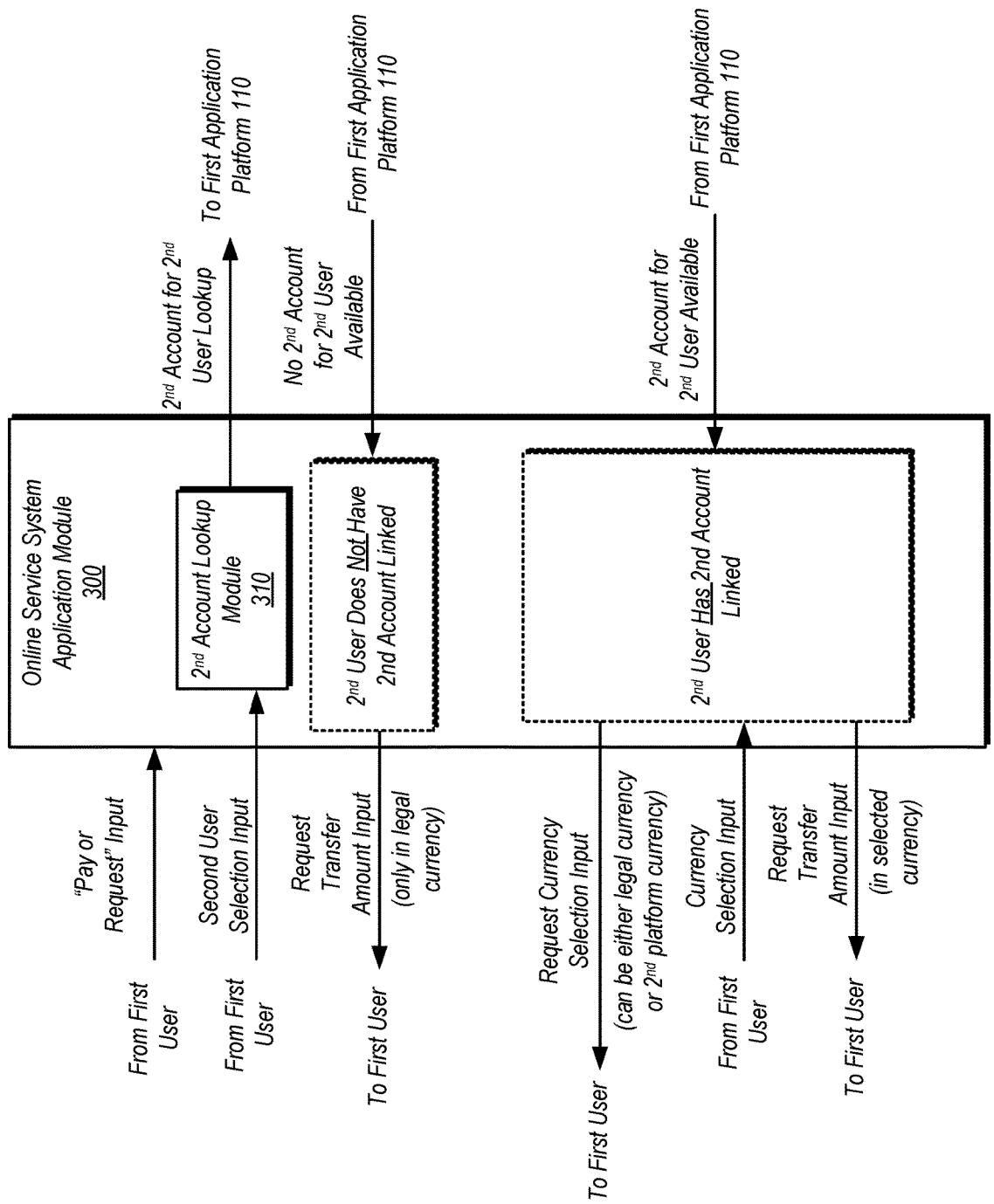
FIG. 3 is a block diagram of an online service system application module, according to some embodiments.

In various embodiments, the potential for conducting a transaction in the second currency may be implemented into a user's experience with the online service system. For instance, a user may be provided an option by an application associated with the online service system to conduct a transaction using the second (digital gaming currency). FIG. 3 is a block diagram of online service system application module 300, according to some embodiments. Online service system application module 300 may be an application module installed on a hardware system (e.g., a mobile device) that implements any of various software applications associated with the online service system served by first application platform 110. For example, online service system application module 300 may implement an "app" associated with the online service system served by first application platform 110.

In the illustrated embodiment, online service system application module 300 interacts with a user (e.g., through a user interface of the hardware system) to conduct one or more operations associated with the online service system. In various embodiments, a first user provides an input to "pay or request" funds from a second user defined by the "second user selection input", which is received by second account lookup module 310. Second account lookup module 310 may then access first application platform 110 to determine whether the second user has a second account (e.g., an account from second application platform 120 (the "online gaming platform") linked with the second user's account from first application platform 110).

In a first embodiment, first application platform 110 returns that there is no second account for the second user (e.g., the second user does not have an account from second application platform 120 linked with the second user's account on first application platform 110). In the first embodiment, online service system application module 300 requests a transfer amount input from the first user in only in a legal currency (e.g., a generic currency such as U.S. dollars). The request is only made in the legal currency since no second account for the second user has been found.

In a second embodiment, first application platform 110 returns that there is a second account for the second user (e.g., the second user has an account from second application platform 120 linked with the second user's account on first application platform 110). In the second embodiment, online service system application module 300 may then request the first user to select a currency (e.g., either the legal currency or the second (digital gaming) currency) for the transfer amount. The first user may then provide his/her currency selection and online service system application module 300 will request a transfer amount input from the first user in the selected currency. As shown in FIG. 3, online service system application module 300 may provide a user experience that implements the second (digital gaming) currency when a user's account is integrated and linked between first application platform 110 and second application platform 120.

Figure 4:
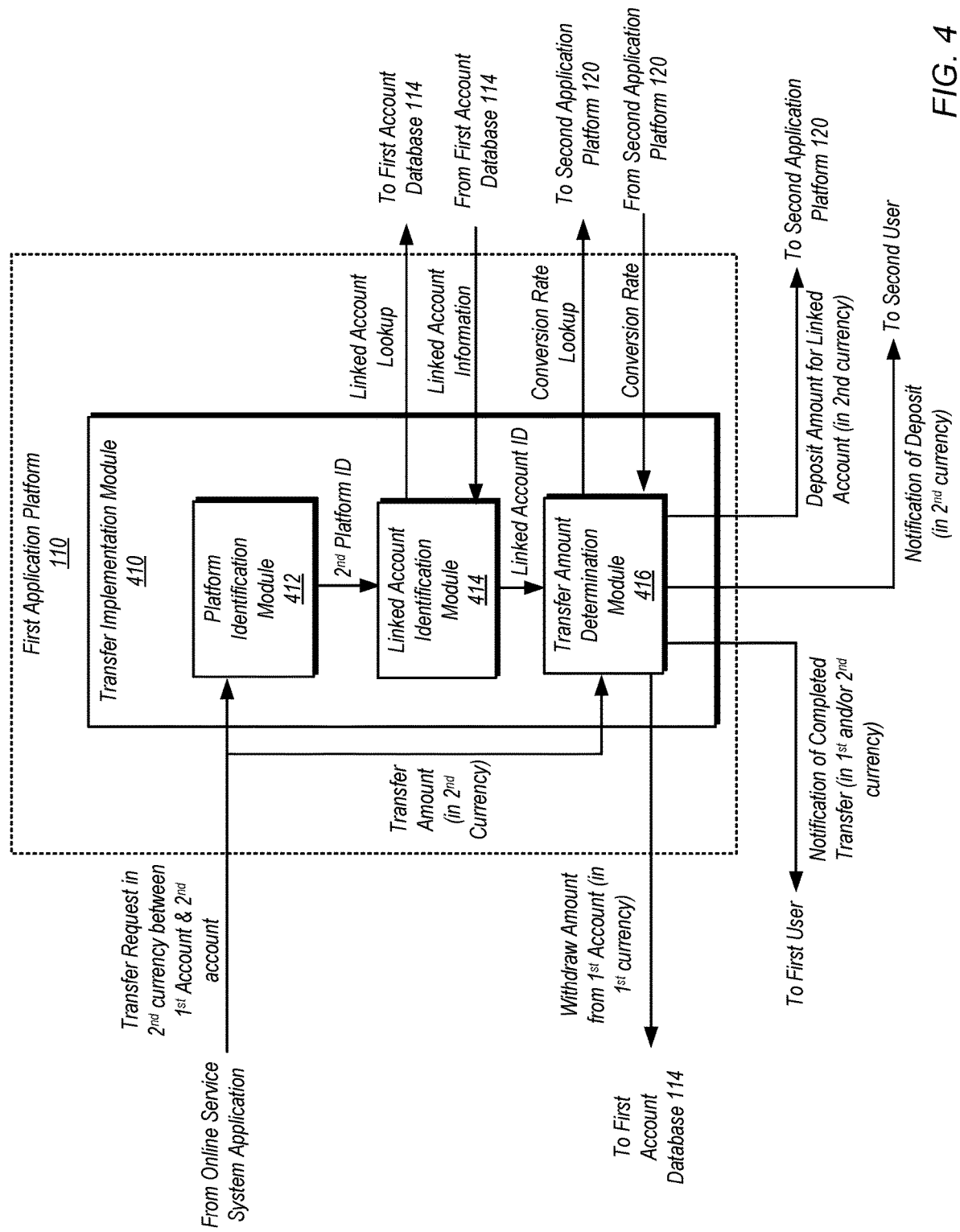
FIG. 4 is a block diagram of a transfer implementation module in a first application platform, according to some embodiments.

In various embodiments, first application platform 110 is capable of conducting transactions (e.g., services) using the second currency after integration between first application platform 110 and second application platform 120 and linking of a user's accounts between the application platforms. FIG. 4 is a block diagram of transfer implementation module 410 in first application platform 110, according to some embodiments. In the illustrated embodiment, transfer implementation module 410 includes platform identification module 412, linked account identification module 414, and transfer amount determination module 416.

In a contemplated embodiment, a first user provides a request to transfer an amount in the second currency (e.g., the digital gaming currency) from the first user's account to a second user's account in first application platform 110. The request may be made, for example, via an online service system application associated with first application platform 110. The request may be received by platform identification module 412. Platform identification module 412 may access a lookup table or other map to identify the application platform based on the currency in the request (e.g., the second currency). In the illustrated embodiment, platform identification module 412 identifies second application platform 120 (e.g., the gaming platform) as the application platform associated with the second currency in the request.

The identification of second application platform 120 may then be provided to linked account identification module 414. Linked account identification module 414 may access first account database 114 or another storage location of linked account information to determine whether the second user has an account from second application platform 120 linked to the second user's account on first application platform 110. If linked account identification module 414 cannot identify a linked account, then the transaction request may be cancelled and a notification may be provided to the first user that the requested transaction cannot be completed (not shown). If linked account identification module 414 finds a linked account, then the linked account information may be accessed and the linked account information is provided to transfer amount determination module 416.

In response to receiving the linked account information, transfer amount determination module 416 may conduct a conversion rate lookup in second application platform 120. Transfer amount determination module 416 may determine where to look up the conversion rate based on, for example, a currency conversion endpoint for second application platform 120 registered in first application platform 110, as described above. Transfer amount determination module 416 then retrieves the currency conversion rate between the second currency (the digital gaming currency) and the first currency (e.g., the generic currency being implemented in first application platform 110 or a currency associated with the first user).

In the illustrated embodiment, transfer amount determination module 416 converts the amount of the second currency from the request to an amount in the first currency based on the received currency conversion rate. Transfer amount determination module 416 withdraw the determined amount in the first currency from the first user's account on first application platform 110. For instance, the amount in the first currency may be withdrawn from the first user's account in first account database 114. At or around the same time, transfer amount determination module 416 may send the requested amount in the second currency for deposit in the second user's linked account in second application platform 120. In certain embodiments, the deposit is placed into the second user's linked account in second account database 124 (shown in FIG. 1).

In some embodiments, the first user or the second user may receive a notification that the transfer has been completed between their respective accounts. For example, the first user may receive a notification that the transfer of the requested amount in the second currency has been completed to the second user. The notification may also indicate an amount of the first currency withdrawn from the first user's account on first application platform 110. The second user may receive a notification that the amount in the second currency has been deposited in the second user's account on second application platform 120. The notification may, however, not have any indication of the conversion that took place between the first currency and the second currency (e.g., the second user is only aware of the deposit in the second currency).

As described herein, integration between first application platform 110 (e.g., an online service application platform) and second application platform 120 (e.g., a gaming platform) allows users to send/receive money between the two application platforms. The integration further allows users to send/receive money in the currency associated with the gaming platform (e.g., the digital gaming currency). Accordingly, users can send/receive money directly from their accounts in an online service system (e.g., PayPal® or Venmo®) to theirs or others account in an online gaming system (e.g., Roblox or Fortnite) without the need for purchasing digital gaming currency through an "in app" purchase or other purchase controlled by the operating system hosting the gaming platform.

Example Methods

FIG. 5 is a flow diagram illustrating a method for integrating application platforms, according to some embodiments. Method 500 shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 810, described below.

At 502, in the illustrated embodiment, a computer system integrates a first application platform with a second application platform, where the first application platform implements a first currency that is generic to the first application platform, and where the second application platform implements a digital currency specific to the second application platform.

At 504, in the illustrated embodiment, integrating the first application platform with the second application platform includes: registering the digital currency with the first application platform.

At 506, in the illustrated embodiment, integrating the first application platform with the second application platform includes: registering an application key located on the second application platform with the first application platform, the application key being associated with the first application platform.

At 508, in the illustrated embodiment, integrating the first application platform with the second application platform includes: accessing one or more endpoints associated with the second application platform where registration of the application key provides access to the one or more endpoints for the first application platform, where at least one of the endpoints is a user account lookup endpoint on the second application platform, and where at least one of the endpoints is a currency conversion endpoint between the digital currency and the first currency.

At 510, in the illustrated embodiment, integrating the first application platform with the second application platform includes: registering the accessed endpoints with the first application platform.

In some embodiments, the user account lookup endpoint identifies a resource to find user account information in the second application platform. In some embodiments, the currency conversion endpoint identifies a resource to find a conversion rate for the digital currency in the second application platform. In some embodiments, at least one of the endpoints is a wallet deposit endpoint for a user account on the second application platform, the wallet deposit endpoint identifying a resource to a wallet for depositing the digital currency in the second application platform.

In some embodiments, the first application platform is a transaction service platform and the second application platform is a gaming platform. In some embodiments, the digital currency is a non-legal tender currency and the generic currency is a legal tender currency.

FIG. 6 is a flow diagram illustrating a method for integrating accounts on application platforms, according to some embodiments. Method 600 shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 810, described below.

At 602, in the illustrated embodiment, a first application platform receives a request to enable a first user account associated with the first application platform to operate with the digital currency. In some embodiments, the request to enable the first user account associated with the first application platform to operate with the digital currency is received from a user application associated with the first application platform.

At 604, in the illustrated embodiment, the first application platform identifies a second application platform based on the request to enable operation with the digital currency.

At 606, in the illustrated embodiment, the first application platform receives identification information for a second user account associated with the second application platform, the second user account being associated with a user of the first user account. In some embodiments, a user is prompted to provide the identification information for the second user account in response to identifying the second application platform.

At 608, in the illustrated embodiment, the first application platform accesses account information for the second user account on the second application platform.

At 610, in the illustrated embodiment, the first application platform integrates the first user account with the second user account where integration between the first user account and the second user account includes storing the account information for the second user account on the first application platform with the second user account linked to the first user account. In some embodiments, integrating the first user account with the second user account includes providing authentication for the second user account on the second application platform.

FIG. 7 is a flow diagram illustrating a method for transferring currency between accounts on application platforms, according to some embodiments. Method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 810, described below.

At 702, in the illustrated embodiment, a first application platform receives a request to transfer a specified amount of a digital currency from a first account for a first user to a second account for a second user on the first application platform where the digital currency is specific to a second application platform, the first application platform being integrated with the second application platform.

At 704, in the illustrated embodiment, the first application platform identifies an account for the second user on the second application platform that is linked with the second account on the first application platform.

At 706, in the illustrated embodiment, the first application platform determines a specified amount of a generic currency for the transfer of the specified amount of the digital currency based on a currency conversion rate between the digital currency and the generic currency.

At 708, in the illustrated embodiment, the specified amount of the generic currency is transferred from the first account to the second account where the second account receives the transfer in the specified amount of the digital currency from the transfer request.

Example Computer System

Figure 8:
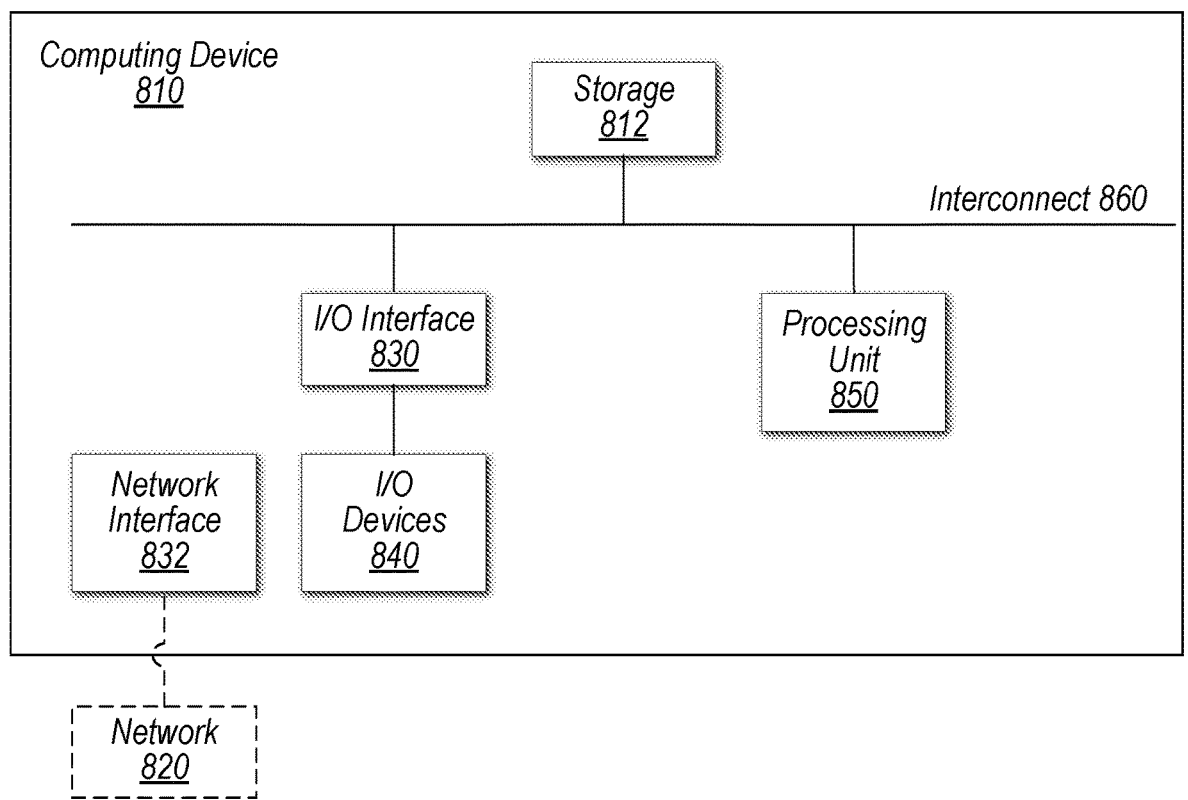
FIG. 8 is a block diagram of one embodiment of a computer system.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 812 is usable by processing unit 850 (e.g., to store instructions executable by and data used by processing unit 850). Storage 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 812 may consist solely of volatile memory, in one embodiment. Storage 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   integrating, by a computer system, a first application platform with a second application platform, wherein the first application platform implements a first currency that is generic, wherein the second application platform implements a digital currency that only has value for use in association with the second application platform, and wherein integrating the first application platform with the second application platform includes:
   generating, at the first application platform, a lookup table that links the digital currency to the second application platform to register the digital currency with the first application platform;
   registering, at the first application platform, an application key associated with the first application platform received by and located on the second application platform, wherein registering the application key provides the first application platform access to resources on the second application platform;
   accessing, at the first application platform, a plurality of endpoints associated with the second application platform, wherein the endpoints include lookup locations for the resources on the second application platform, wherein at least one of the accessed endpoints is a user account lookup endpoint on the second application platform, and wherein at least one other of the accessed endpoints is a currency conversion endpoint between the digital currency and the first currency; and
   linking the accessed endpoints to the second application platform in a registration at the first application platform to provide access on the first application platform to the lookup locations for the resources on the second application platform associated with the accessed endpoints.

2. The method of claim 1, further comprising:
   receiving, at the first application platform, a request to enable a first user account associated with the first application platform to operate with the digital currency;
   identifying, by the first application platform, the second application platform based on the lookup table and the digital currency in the request;
   receiving, at the first application platform, identification information for a second user account associated with the second application platform, the second user account being associated with a user of the first user account;
   accessing, by the first application platform, account information for the second user account from the second application platform based on the linked user account lookup endpoint; and
   linking, by the first application platform, the first user account with the second user account, wherein linking the first user account with the second user account includes storing the account information for the second user account on the first application platform and enabling the first user account to conduct transactions using the digital currency according to a conversion rate determined based on the linked currency conversion endpoint.

3. The method of claim 2, further comprising prompting a user to provide the identification information for the second user account in response to identifying the second application platform.

4. The method of claim 2, wherein integrating the first user account with the second user account includes providing authentication for the second user account on the second application platform.

5. The method of claim 2, wherein the request to enable the first user account associated with the first application platform to operate with the digital currency is received from a user application associated with the first application platform.

6. The method of claim 1, wherein the user account lookup endpoint identifies a resource to find user account information in the second application platform.

7. The method of claim 1, wherein the currency conversion endpoint identifies a resource to find a conversion rate for the digital currency in the second application platform.

8. The method of claim 1, wherein the first application platform is a transaction service platform, and wherein the second application platform is a gaming platform.

9. The method of claim 1, wherein the digital currency is currency that is managed, stored, or exchanged through designated software specific to the second application platform.

10. The method of claim 1, wherein at least another of the accessed endpoints is a wallet deposit endpoint for a user account on the second application platform, the wallet deposit endpoint identifying a resource to a wallet for depositing the digital currency in the second application platform.

11. A non-transitory computer-readable medium having instructions stored thereon that are executable by a computing device to perform operations, comprising:
  integrating, by a computer system, a first application platform with a second application platform, wherein the first application platform implements a first currency that is generic, wherein the second application platform implements a digital currency that only has value for use in association with the second application platform, wherein integrating the first application platform with the second application platform includes:
    generating, at the first application platform, a lookup table that links the digital currency to the second application platform to register the digital currency with the first application platform;
    registering, at the first application platform, an application key associated with the first application platform received by and located on the second application platform, wherein registering the application key provides the first application platform access to resources on the second application platform;
    accessing, at the first application platform, a plurality of endpoints associated with the second application platform, wherein the endpoints include lookup locations for the resources on the second application platform, wherein at least one of the accessed endpoints is a user account lookup endpoint on the second application platform, and wherein at least one other of the accessed endpoints is a currency conversion endpoint between the digital currency and the first currency; and
    linking the accessed endpoints to the second application platform in a registration at the first application platform to provide access on the first application platform to the lookup locations for the resources on the second application platform associated with the accessed endpoints.

12. The non-transitory computer-readable medium of claim 11, further comprising:
  receiving, at the first application platform, a request to enable a first user account associated with the first application platform to operate with the digital currency;
  identifying, by the first application platform, the second application platform based on the lookup table and the digital currency in the request;
  receiving, at the first application platform, identification information for a second user account associated with the second application platform, the second user account being associated with a user of the first user account;
  accessing, by the first application platform, account information for the second user account from the second application platform based on the linked user account lookup endpoint; and
  linking, by the first application platform, the first user account with the second user account, wherein linking the first user account with the second user account includes storing the account information for the second user account on the first application platform and enabling the first user account to conduct transactions using the digital currency according to a conversion rate determined based on the linked currency conversion endpoint.

13. The non-transitory computer-readable medium of claim 12, further comprising providing, on the first application platform after linking the first user account with the second user account, an option for selecting the digital currency on a user interface associated with the first application platform during a transaction involving the first user account.

14. The non-transitory computer-readable medium of claim 13, further comprising converting, according to the conversion rate determined based on the linked currency conversion endpoint, the first currency to the digital currency in response to a user selecting the option for the digital currency.

15. The non-transitory computer-readable medium of claim 11, wherein the first application platform is a gaming platform, and wherein the digital currency is a non-legal tender currency implemented by the gaming platform for transactions associated with one or more games on the gaming platform.

16. The non-transitory computer-readable medium of claim 12, wherein linking the first user account with the second user account includes:
  providing authentication for the second user account on the second application platform; and
  storing the account information for the second user account on the first application platform with the second user account linked to the first user account on the first application platform.

17. A system, comprising:
  a processor circuit; and
  a memory circuit including instructions that when executed by processor circuit, cause the system to perform operations including:

integrating a first application platform with a second application platform, wherein the first application platform implements a first currency that is generic, wherein the second application platform implements a digital currency that only has value for use in association with the second application platform, and wherein integrating the first application platform with the second application platform includes:

generating, at the first application platform, a lookup table that links the digital currency to the second application platform to register the digital currency with the first application platform;

registering, at the first application platform, an application key associated with the first application platform received by and located on the second application platform, wherein registering the application key provides the first application platform access to resources on the second application platform;

accessing, at the first application platform, a plurality of endpoints associated with the second application platform, wherein the endpoints include lookup locations for the resources on the second application platform, wherein at least one of the accessed endpoints is a user account lookup endpoint on the second application platform, and wherein at least one other of the accessed endpoints is a currency conversion endpoint between the digital currency and the first currency; and linking the accessed endpoints to the second application platform in a registration at the first application platform to provide access on the first application platform to the lookup locations for the resources on the second application platform associated with the accessed endpoints.

18. The system of claim 17, wherein the operations further include:

receiving, at the first application platform, a request to enable a first user account associated with the first application platform to operate with the digital currency;

identifying, by the first application platform, the second application platform based on the lookup table and the digital currency in the request;

receiving, at the first application platform, identification information for a second user account associated with the second application platform, the second user account being associated with a user of the first user account;

accessing, by the first application platform, account information for the second user account from the second application platform based on the linked user account lookup endpoint; and linking, by the first application platform, the first user account with the second user account, wherein linking the first user account with the second user account includes storing the account information for the second user account on the first application platform and enabling the first user account to conduct transactions using the digital currency according to a conversion rate determined based on the linked currency conversion endpoint.

19. The system of claim 17, wherein the user account lookup endpoint identifies a resource to find user account information in the second application platform.

20. The system of claim 17, wherein the currency conversion endpoint identifies a resource to find a conversion rate for the digital currency in the second application platform.

* * * * *